Sept. 29, 1942.　　　F. JANOVSKY　　　2,297,414
DIRECTION FINDING SYSTEM
Filed Jan. 6, 1940
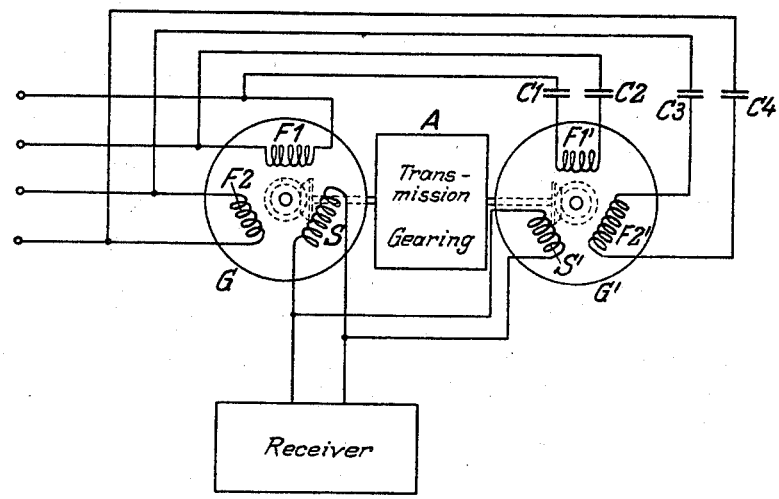
Inventor:
Franz Janovsky
by E.O.Phinney
Atty.

Patented Sept. 29, 1942

2,297,414

UNITED STATES PATENT OFFICE 2,297,414

DIRECTION FINDING SYSTEM

Franz Janovsky, Berlin, Germany; vested in the Alien Property Custodian

Application January 6, 1940, Serial No. 312,660
In Germany January 18, 1939

2 Claims. (Cl. 250—11)

As is well known the operation of direction finding systems is impaired by errors which periodically recur. For instance, in systems comprising Adcock antennae and goniometers an octantal error arises whenever the wavelength is not great in relation to the base of the antenna arrangement, that is to say, in relation to the distances between the antennae. For small error angles the octantal error rises approximately quadratically with the respective frequency.

In order to compensate such periodically recurring errors mechanical means, as cam discs for instance, have been employed. This compensation, however, has been used only for correcting constant errors, that is, errors not affected by frequency conditions, whereas changes which the errors undergo in the event of frequency variations, that is, in the case of the wavelength changing, are not corrected. It has therefore been necessary to provide a separate cam disc for each wavelength and to exchange such disc in the event of a wave change.

The present invention is concerned with a goniometer device for compensating errors of this kind, namely, errors which arise periodically and are preferably octantal. This device is arranged to compensate also variations the errors undergo in the event of frequency variations. The invention consists in associating with the goniometer proper or main goniometer an auxiliary goniometer which is driven from the shaft of the main goniometer and with a ratio of transmission that corresponds with the error to be compensated. In the case of octantal errors such transmission ratio should be 1:5. The field coils and search coil of the main goniometer and those of the auxiliary goniometer are connected in parallel.

The drawing is a diagrammatic representation showing one embodiment of the invention.

The main goniometer is designated G while G' denotes the auxiliary goniometer. The search coils S, S' are connected in parallel. The field coils F1, F2 of the goniometer G are in well-known manner connected to a directional antenna system each, this being preferably an Adcock system. The coils F1', F2' of the goniometer G' are coupled to the coils F1, F2 over condensers C1, C2, C3, C4. The coils S, S' are interconnected by means of a transmission gearing A that may be composed of toothed wheels, for example. Goniometer G' consequently produces a periodically varying voltage which according to the invention corresponds with the error voltage in a manner to compensate it. On account of the capacitive coupling C1 to C4 between the field coils the voltage of the goniometer G' and consequently the correction it undergoes depend on frequency conditions. Such compensation hence applies for any wavelength.

What is claimed is:

1. A direction finding system comprising a plurality of antenna elements, a main goniometer, and means for compensating periodically recurring octantal errors in the operation of said system caused by effective rotation of an antenna having elements spaced an appreciable distance with respect to the wavelength of operation, comprising an auxiliary goniometer, means for electrically coupling said goniometers together in parallel, and transmission gearing having a ratio of 1:5 to rotate said auxiliary goniometer five revolutions for each revolution of said main goniometer and in the same direction.

2. A system according to claim 1, further comprising frequency dependent means in said means for electrically coupling for rendering the voltage of said auxiliary goniometer dependent upon frequency conditions.

FRANZ JANOVSKY.